United States Patent [19]

Eckart

[11] Patent Number: 5,408,606
[45] Date of Patent: Apr. 18, 1995

[54] COMPUTER GRAPHICS SYSTEM WITH PARALLEL PROCESSING USING A SWITCH STRUCTURE

[75] Inventor: Glen A. Eckart, Salt Lake City, Utah

[73] Assignee: Evans & Sutherland Computer Corp., Salt Lake City, Utah

[21] Appl. No.: 1,441

[22] Filed: Jan. 7, 1993

[51] Int. Cl.⁶ .............................................. G06F 3/14
[52] U.S. Cl. .................................... 395/163; 395/162
[58] Field of Search ................................ 395/162–166, 395/121, 122, 126, 133, 134, 138, 139, 325

[56] References Cited

U.S. PATENT DOCUMENTS

| | | | |
|---|---|---|---|
| 4,807,183 | 2/1989 | Kung et al. | 364/900 |
| 4,918,626 | 4/1990 | Watkins et al. | 395/121 |
| 4,949,280 | 8/1990 | Littlefield | 395/163 |

OTHER PUBLICATIONS

IEEE Computer Graphics and Application, Nov. 1992, "Breaking the Frame Buffer Bottleneck with Logic—Enhanced Memory", Poulton et al, pp. 65–74.

Parke, Frederic I., Simulation and Expected Performance Analysis of Multiple Processor Z-Buffer Systems, pp. 48–56, Jul. 1980, U.S. in *Computer Graphics*.

Stone, Harold S., High Performance Computer Architecture, pp. 305–310, 1987, U.S.

Foley, Van Dan, Feiner and Hughes, Computer Graphics: Principles and Practice, 2nd Ed., pp. 866–867, 1990, U.S.

*Primary Examiner*—Mark R. Powell
*Assistant Examiner*—Kee M. Tung
*Attorney, Agent, or Firm*—Nilsson, Wurst & Green

[57] ABSTRACT

Front end processors in a graphics architecture execute parallel scan conversion and shading to first process individually assigned primitive objects for providing update pixels. A crossbar accommodates data rearrangement whereby parallel pixel processors with associated memory capabilities (frame buffer banks) perform visibility and blending operations on predetermined sequences of update pixels to provide display pixels. The pixel processors identify with sequences of pixels in the display in patterns designed to equalize processor loads for pixels located along scan lines or distributed over an area. Specific distribution criteria are disclosed for patterns. One form of pixel processor organization incorporates a distributed frame buffer with FIFO memory and control stacks. Display pixels are received by a multiplexer to supply a digital-analog connector with display data in raster sequence.

15 Claims, 4 Drawing Sheets

COMPUTER GRAPHICS SYSTEM WITH PARALLEL PROCESSING USING A SWITCH STRUCTURE

BACKGROUND AND SUMMARY OF THE INVENTION

1. Field of the Invention

The invention relates to the field of computer graphics, specifically to data processor structures utilizing substantially independent parallel processors in distinct phases of operations.

2. Prior Development Considerations

Perhaps video games are the best known form of computer graphics systems. However, the technology involves a considerable number of other forms of display apparatus as for training, designing, modelling and so on. Typically these systems give the viewer the impression of looking at a television set, or through a window at a scene. In graphics terminology, the window is called a "viewport". The creation of a scene in a "viewport" from primitive object data involves several individual processing operations as generally well known in the art. Scenes are created with respect to a specific viewpoint.

At the outset, a computer graphics system must traverse a data structure and select the object data that is relevant to the scene. Object data may represent objects, polygons or lines. The selected object data is transformed into a convenient coordinate system where it can be compared to the viewport. Such comparison enables the data to be clipped in that those parts of objects that lie outside the viewport are cut away.

After object data for a scene is defined for a specific viewpoint, it is scan converted, specifically it is changed from a set of vertices and connectivity information that imply lines and surfaces, to a list of picture elements (pixels) that can be processed to depict the lines and surfaces. The pixels also may be preliminarily shaded, that is color determinations are indicated.

In processing individual pixels, the visibility of object surfaces is determined for each pixel. That is, only the closest surface to the viewer should be visible as represented by each pixel in a display. The most common algorithm used to omit hidden surfaces involves the so called "Z buffer". Each pixel is assigned a Z value that indicates the distance from a specific surface location to a viewpoint. Essentially, Z values of the dissected surfaces are compared and of all the surface locations contending for presence in a pixel, the one that is closest to the viewpoint may be stored in a frame buffer. Data representing other surfaces is discarded. Numerous visibility algorithms exist, as for instance see U.S. Pat. No. 4,918,626, entitled *COMPUTER GRAPHICS PRIORITY SYSTEM WITH ANTIALIASING*, issued Apr. 17, 1992, to Gary S. Watkins, Glen A. Eckart and Russell A. Brown.

To improve the appearance of displays, another pixel processing step involves blending pixels. That is, to avoid jagged lines or edges and accommodate transparency, the representations of two surfaces that contend for presence in a pixel, may be blended.

In the generation of picture data, individual pixel data stored in the frame buffer is reformatted and provided in a raster scan lined pattern to drive a display apparatus, e.g. a cathode ray (CRT) apparatus. As the data is processed, the frame buffer containing frame buffer pixels is cyclically updated or refreshed by blending update pixels with old frame buffer pixels to reflect additional primitives or a changing scene.

The operations attendant the steps as explained above involve vast amounts of computation. For example, a scene may be composed from hundreds of thousands of polygons each of which must be processed with its presence reflected in individual display pixels.

As is the case in much of the field of computer engineering, one trick to make computations run fast involves parallelism. In that regard, in various applications within the computer field, it has been proposed to variously partition computations among parallel processors. Broadly, the system of the present invention is a graphics system utilizing parallel processing.

SUMMARY OF THE INVENTION

In general, the system of the present invention incorporates pluralities of processors operating in parallel at different stages to independently process computer graphics data. Essentially, a front end set of primitive processors operate in parallel to transform, clip, scan convert and shade individual polygons, e.g. triangles, thereby producing an output stream of shaded pixels. A crossbar routing structure rearranges the streams of shaded pixels to be further processed in parallel based on screen-space partitioning. For example, pixels are selectively applied to visibility-and-blend processors based on a partitioning of screen space. Accordingly, display processors are assigned on the basis of screen space partitioning, also functioning in parallel to complete the processing. Criteria are described for partitioning or mapping between the processors and the display.

Essentially, the front end parallel primitive processors operate with primitive independence, for example, a specific polygon is assigned to a specific processor. In the disclosed system, each primitive processor transforms, clips, scan converts and shades a polygon to produce a sequence or stream of shaded update pixels. Visibility-and-blend processors then perform parallel processing based on screen-space partitioning as between old or existing frame buffer pixels and update pixels. These processors determine visibility and blend the result (frame buffer pixels) into a fragmented frame buffer. The display processors execute parallel processing based on screen-space partitioning in accordance with selected criteria. Essentially, the display processors reformat pixels for display and output data in a raster pattern.

BRIEF DESCRIPTION OF THE DRAWINGS

In the drawings, which constitute a part of the specification, exemplary embodiments of the invention are set forth and illustrated as follows.

DESCRIPTION OF THE ILLUSTRATIVE EMBODIMENTS

As indicated above, an illustrative embodiment of the present invention is disclosed herein. However, physical apparatus, data and partitioning formats as well as component systems in accordance with the present invention may be embodied in a wide variety of forms, some of which may be quite different from those disclosed herein. Consequently, the specific structural and functional details represented herein are merely representative; yet in that regard, they are deemed to afford the best embodiment for purposes of disclosure and to provide a basis for the claims herein which define the scope of the present invention.

Generally it is to be understood that within a computer graphics system, data structure is organized in some form of a tree or directed graph. For example, the root of the data structure may represent a scene. The hierarchy of the data structure follows the scene. Accordingly, primary branches hold gross scene features, modelling transforms and properties. Terminal branches hold basic primitives, such as triangles or lines. Terminal branches or primitives inherit properties such as color, texture, orienting transformations and illumination for more primary branches near the root. Such operation allows the data structure to be succinct and relatively easy to update whereby to modify a scene.

Figure 1:
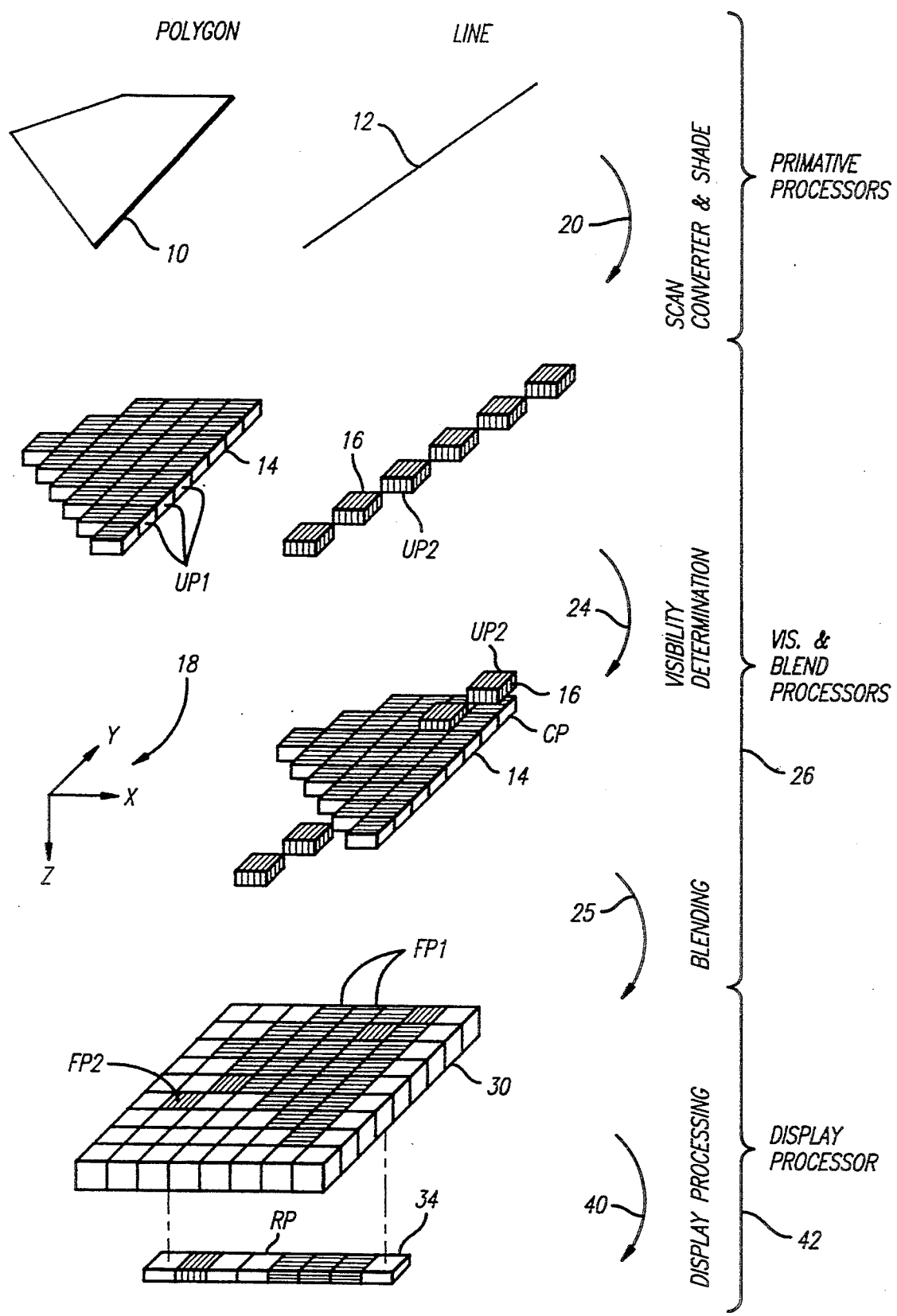
FIG. 1 is a graphic representation illustrating the operation of the system as disclosed herein.

Typically, the data structure is traversed to identify primitives relevant to a scene along with their inherited transforms and properties. The traversal may output various primitives, for example a polygon 10 or a line 12 as shown in FIG. 1. As illustrated, the polygon 10 and the line 12 have been transformed, clipped and shaded in accordance with techniques as well known in the art. The next processing step involves scan conversion as illustrated by the arcuate arrow 20 (FIG. 1, left). Note that in order to accommodate the effective illustration of various operations, FIG. 1 is grossly out of proportion. Specifically, individual pixels are illustrated as boxes, greatly enlarged in relation to the polygon 10 and the line 12.

The scan conversion of the polygon 10 provides an array 14 of update pixels UP1 roughly coinciding in shape to the polygon 10. Similarly, the line 12 is scan converted to a representative row 16 of update pixels UP2. The term "update pixels" (UP) is employed to indicate that these quanta are commands to update the picture elements as presently stored in the frame buffer as will be described in detail below. That is, in cyclic operations, update pixels are processed with reference to frame buffer pixel representations and the contents of the frame buffer is updated accordingly. For purposes of explanation, the pixels UP1 will be treated below as frame buffer pixels to be updated.

As indicated above, in FIG. 1, the pixels UP1 and UP2 are represented by small boxes to suggest a three dimensional effect. In that regard, a small cube corner 18 illustrates the three dimensional coordinate systems. Specifically, the x axis is horizontal and positive to the right. The y axis is positive toward the upper right, intended to give the impression of a dimension that extends directly into the paper. The z axis is vertical and positive downwardly. Accordingly, with these axes, the pixels UP1 of the array 14 extend in x and y directions, but have a common z value (depth). The update pixels UP2 of the row 16 increment in the x and y dimensions and also decrement in the z dimension (depth), proceeding from left to right.

The pixels UP1 and UP2 are shaded to represent an indication of color that could vary from pixel to pixel. Accordingly, as indicated by the arcuate arrow 20 (FIG. 1, right) the change from the polygon 10 and the line 12 respectively to the array 14 and the row 16 indicates scan converting and shading. Such operations are traditionally performed by primitive processors as known in the art.

The next step in processing data for a display involves visibility determination as indicated by the arcuate arrow 24 (FIG. 1, right). For the involved pixel locations or positions in the display, pixels of the polygon 10 and the line 12 are compared to determine which is in front with reference to the viewer. The front pixel is determined as having a smaller z dimension value and accordingly, in case of an overlap, is indicated to block the rear pixel.

Referring to FIG. 1, the two right-most update pixels of the row 16 are above (lesser z value) the corresponding update pixels of the array 14. Accordingly, they will be visible in the pixel combination CP as illustrated.

Moving from right to left down the row 16, the third and fourth pixels UP2 will be concealed by pixels UP1 of the polygon 14. However, the last two pixels UP2 (left) are outside the perimeter of the array 14 and accordingly are visible. Thus, the pixel combination CP illustrates the short line (line 12) extending through a polygon (polygon 10) in piercing relationship.

The visibility determination step as described above is indicated by an arcuate arrow 24 (FIG. 1 right) and traditionally is performed by a processor along with blending operations as will now be described. The combination operation is performed by visibility and blend processors as indicated by the bracket 26 (FIG. 1 extreme right).

The blending operation, as represented by the arcuate arrow 25 involves blending and storing the final result into a frame buffer 30. For true blending, the resulting pixels end up being some intermediate color and brightness between the attributes of the blended starting pixels. However, within the limitations of black and white representation, shades of grays are employed to imply blending.

The frame buffer 30 (FIG. 1, bottom) stores an array of frame buffer pixels, each being represented by a small cube. Note that the pixels in the frame buffer 30 are somewhat larger than the pixels UP1–UP2 to imply that more data is stored in the frame buffer pixels than the update pixels. In the frame buffer 30, the pixel combination CP is indicated by frame buffer pixels FP1 (representing the polygon 10) and pixels FP2 (representing the line 12).

In the operation of blending and storing as described above, it is to be understood that update pixels typically are considered with respect to the present contents of frame buffer pixels (e.g. old frame buffer pixels) and awards are made accordingly. Alternatively, as represented in FIG. 1, for purposes of simplicity it may be implied that the frame buffer was void of pixel representations and processing is between pixels UP1 and UP2.

The final step of rendering is to refresh a raster display based on the contents of the frame buffer 30. Traditionally, display apparatus receives display pixel data in a raster order, line by line, as represented by the row 34. Again, the row includes small cubes indicating display output pixels RP. Representations of the display output pixels RP are more shallow than either the update pixels UP or the frame buffer pixels FP to imply that they contain less data. Essentially, the display output pixels RP contain only the color and intensity information required to drive the display. The operation is indicated by the arcuate arrow 40 and is executed, as indicated by the bracket 42, by one or more display processors.

In general, the system of the present invention involves the processing operations as described above utilizing parallelism, that is, the computations are partitioned among parallel processors. In that regard, the system disclosed herein makes use of both primitive independence and screen-space partitioning to gain parallelism. Primitives (polygons and lines) are processed in parallel on a one-to-one processor-to-primitive basis. Visibility and blending processors also operate in parallel and partitioning is based on screen space. Thus, the two forms of parallelism are accommodated with two different methods of distribution.

Figure 2:
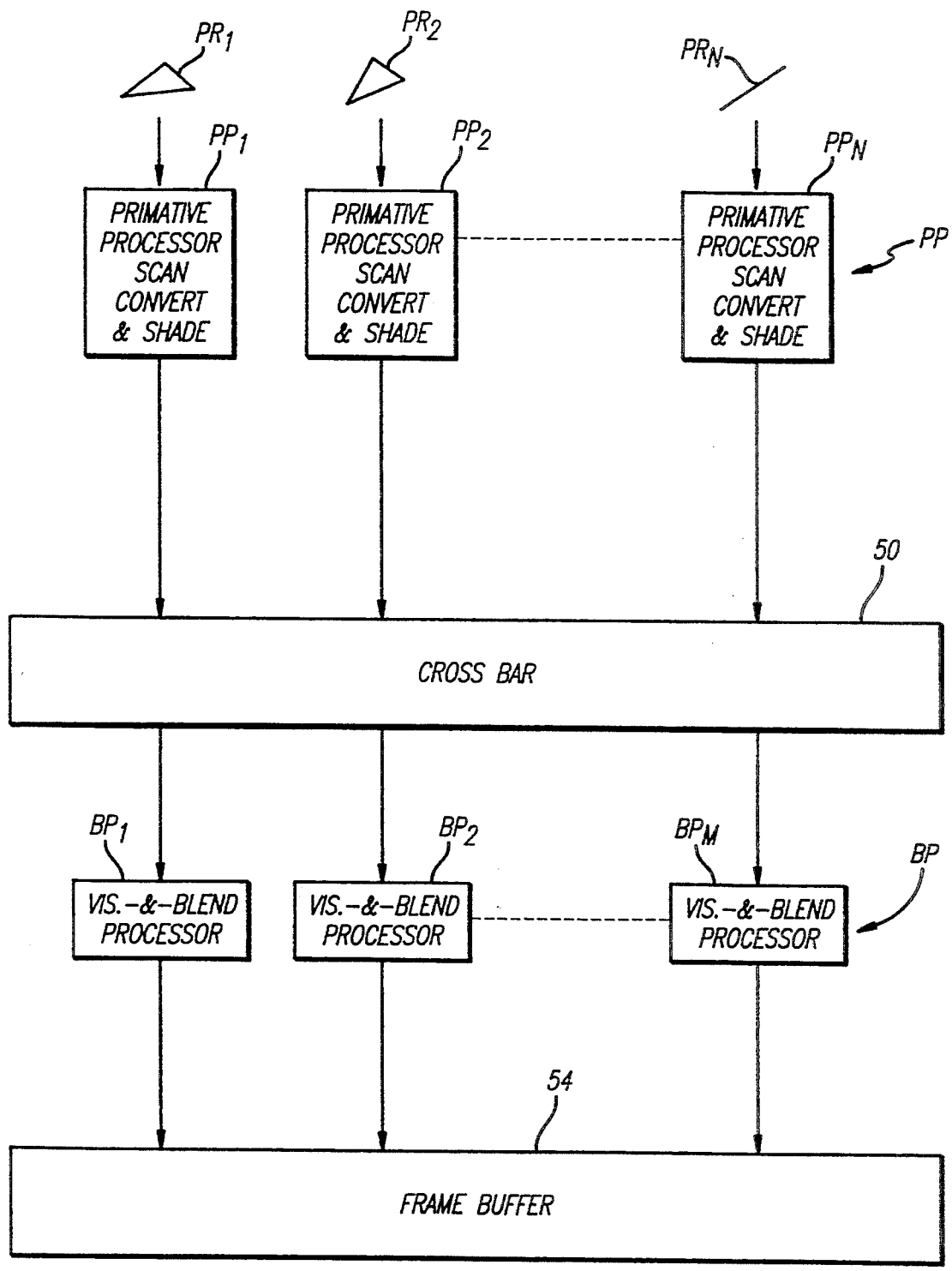
FIG. 2 is a block diagram of a system constructed in accordance with the present invention.

FIG. 2 illustrates the parallel partitioning of the disclosed embodiment. A parallel set PP of primitive processors PP1, PP2 and PPN and a parallel set BP of visibility-blending processors BP1, BP2 and BPM are illustrated. As suggested, the number of either primitive processors PP1–PPN or visibility-blending processors BP1–BPM may vary in any particular installation. Note that the numbers of processors in the sets PP and BP may or may not coincide. Perhaps it is noteworthy that the trend suggests increased numbers of parallel processors. For example, systems in accordance herewith may well employ hundreds of parallel processors.

The primitive processors PP1–PPN are connected through a crossbar 50 to the processors BP1–BPM. Essentially, the crossbar 50 receives pixel data from the primitive processor PP1–PPN (segregated on one basis) and supplies such data to the visibility-blending processors BP1–BPM (segregated on another basis). Generally, crossbar structures for such use are well known in the prior art as disclosed for example in a book, *High-Performance Computer Architecture*, by Harold S. Stone published in 1987 by Addison-Wesley Publishing Company, see the section beginning at page 305. Also, with regard to cross bars, see U.S. Pat. No. 4,807,183 entitled "Programmable Interconnection Chip for Computer System Functional Modules", Kung et al.

The primitive processors PP1, PP2 and PPN are illustrated to receive primitives PR1, PR2 and PRN respectively. Functionally, each of the primitive processors transforms, clips, scan converts and shades the received primitive. That is, the processors execute the data processing operations to reflect such operations in the received data representative of primitives. As indicated above, such operations by each processor PR1–PRN are well known and understood as disclosed in a book, *Computer Graphics: Principles and Practice*, Second Edition, by Foley, Van Dan, Feiner and Hughes published in 1990 by Addison-Wesley Publishing Company, Inc., see section 18.3, Standard Graphics Pipeline beginning on page 866.

As a result of the operations performed by the primitive processors PP1–PPN, each provides a sequence or stream of shaded pixel data to the crossbar 50. Such operations are substantially independent as are the data streams provided to the crossbar 50. For example, the primitive processor PP1 executes the specified operations on the primitive PR1 providing an independent sequence of upgrade pixel data to the crossbar 50. Essentially, the crossbar 50 receives such data sequences from each of the primitive processors PP1–PPN, rearranges the streams and supplies different streams (based on screen space partitioning) to the visibility-blending processors BP1–BPM.

The data streams supplied to the visibility-blending processors BP1–BPM are segregated on the basis of screen-space partitioning. For example, each of the visibility-blend processors BP1–BPM (pixel processors) receive pixel data for predetermined pixel locations in the display array. Accordingly, each of the processors BP1–BPM independently determines visibility and blend, then stores the result into the frame buffer 54 as described below. There is no communication between the visibility-and-blend processors BP1–BPM rather, each processor communicates independently with the frame buffer 54 to resolve visibility between update pixels and old frame buffer pixels as well as to perform blending operations. Accordingly, as each pixel location is processed by a visibility-and-blend processor BP1–BPM, a determination is made with regard to visibility and blending. The result then is stored in the frame buffer 54 as a fresh frame buffer pixel as described above.

Figure 3:
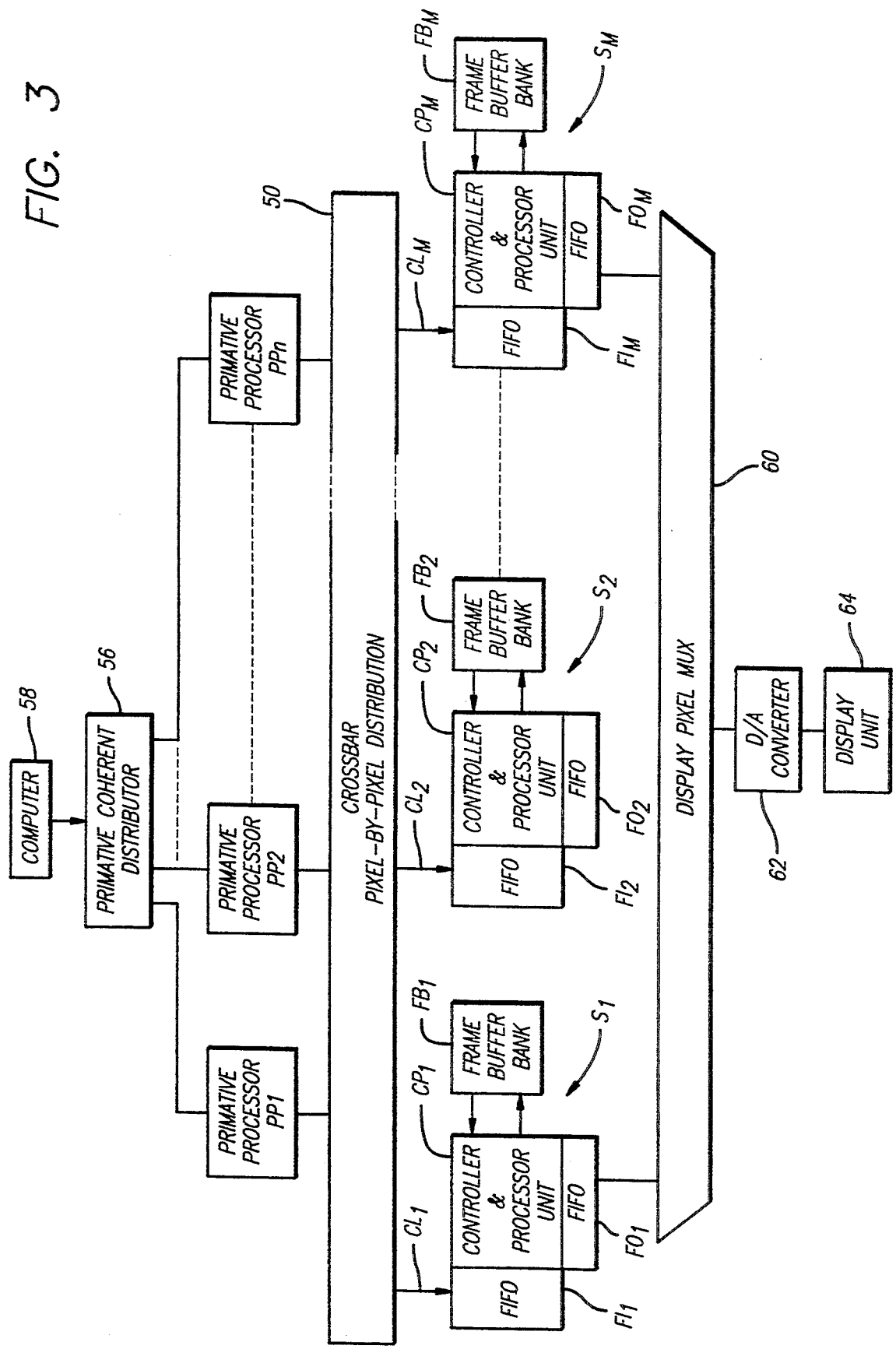
FIG. 3 is a more detailed block diagram of a system in accordance with the present invention.

Recapitulating to some extent, the two distinct forms of parallelism involve the need for apportioning pixel streams to the processors. Specifically, update pixel streams flowing out of the primitive processors PP1–PPN are organized by primitive, that is, they are primitive coherent. Update pixel streams flowing into the visibility and blending processors are organized by frame buffer address, that is, they are screen-space-coherent. The crossbar 50 matches the streams in that it inputs pixels from the primitive-coherent streams, sorts them and outputs them as screen-space coherent streams. Reference will now be made to FIG. 3 for a more detailed treatment of the disclosed system involving multiple parallelism as described above.

In the system of FIG. 3, the primitive processors PP1–PPN receive primitive coherent data through a distributor 56 from a host computer 58. Essentially, the computer 58 provides definitive data for individual primitives that are passed to processors PP1–PPN as the primitives become available. The operation is substantially as described above in that scan conversion and shading is by the primitive processors PP1–PPN to supply sequences of update pixel data to the crossbar 50 for rearrangement.

The parallel data streams of fixed data from the crossbar 50 are to a group of parallel structures S1–SM, each of which incorporates buffers, a processor and a fragment or bank of the composite frame buffer. The structures S1–SM are similar, each including an input FIFO FI1–FIM, a controller and processor unit CP1–CPM, a frame buffer bank, FB1–FBM and an output FIFO FO1–FOM. Note that FIFOs are well known as constituting "first-in-first-out" registers for facilitating time deviations in manipulating data. Forms of FIFOs are well known in the art for example as disclosed in U.S. Pat. No. 4,837,740, granted Jun. 6, 1989 to Ivan E. Sutherland.

To consider a specific processing example, an output stream of pixel data to the line CL1 from the crossbar 50 passes to a FIFO FI1 which supplies a controller processor unit CP1. Other of the structures S2–SM similarly receive update pixel data streams. The function of the individual units CP1–CPM, (pixel processors) as to perform visibility and blending operations is known in the art as described for example in pending U.S. patent application Ser. No. 07/933,322, by Gary S. Watkins entitled *ATTRIBUTE BLENDING SYSTEM FOR COMPOSING COMPUTER GRAPHICS IMAGES FROM OBJECTS.*

As indicated above, the apportioned frame buffer is separated in banks FB1–FBM, that operate respectfully with the individual units CP1–CPM. For example, operation of the unit CP1 in the structure S1 is in cooperation with a frame buffer bank FB1 which constitutes one complement of the composite frame buffer including the storage capability for a set of predetermined pixel locations in the display. Thus, specific update pixels are processed by the units CP1–CPM to develop fresh frame buffer pixels in the frame buffer banks FB1–FBM. Outputs for display from the unit CP1–CPM is through output FIFOs FO1–FOM to a display pixel multiplexer (MUX) 60.

Recapitulating to some extent, each of the structures S1–SM receive update pixel data that is processed to provide updated frame buffer pixels in one frame buffer bank (component of the total frame buffer). When the composite frame buffer (consisting of all the frame buffer banks FB1–FBM) is fully refreshed (usually with the processing of many polygons), the data is supplied to the display pixel multiplexer MUX 60 for delivery to a digital-analogue converter 62 in a raster sequence for driving a display unit 64.

Considering the overall operation of the system of FIG. 3, primitives are supplied from the computer 58 to the primitive coherent distributor 56 which may include a primitive bus for selective distribution in accordance with well known technology. The first available primitive processor PP1–PPN receives the next-in-line primitive from the distributor 56.

The primitive processor PP1–PPN receiving a primitive transforms, clips, scan converts and shades the primitive to provide a stream of primitive-coherent update pixels to the crossbar 50. From the crossbar 50, independent streams of update pixels are delivered to the structures S1–SM including the units CP1–CPM. In that regard, each unit CP1–CPM receives the update pixels through an associated line CL1–CLM respectfully, for a predetermined set of pixel locations.

To consider an example, if pixel locations in screen space were assigned in a raster sequence by the designations: P1, P2, P3, P4, P5, P6, P7, - - - PN, beginning with the first row, consider an exemplary screen space distribution for five units CP1–CP5. For such an arrangement, the controller and processor unit CP1 might process all pixel data for the pixel locations P1, P6, P11, P16 and so on. In the same arrangement, the unit CP2 could be assigned the pixel processing for locations P2, P7, P12, and so on. The processor unit CP3 would be assigned the pixel processing for locations P3, P8, P13, and so on. Thus, the exemplary parallel units CP1–CP5 would receive update pixel information on the basis of screen space partitioning, e.g. pixel display, raster location assignment.

To consider the pixel allocations in greater detail for the frame buffer banks FB1–FBM on the basis of screen space, again assume a raster pattern sequence. Specifically, referring to FIG. 4, the raster pattern may comprise a rectangular array 70 of pixel locations 72 (boxes). Again, in a simplified representation, within the array 70, certain of the pixel locations 72 are designated for processing the polygon 10 (FIG. 1) and the line 12. Specifically, the pixel locations 72 bearing a small triangle 74 are indicated to involve the polygon 10. Somewhat similarly, the pixel locations 72 containing a short line 76 are involved with the line 12. It can be recognized that FIG. 4 affords a basis for considering the assignment of pixel processors (controller and processor units CP1–CPM) for parallel processing.

Figures 4, 5, 6, 7:
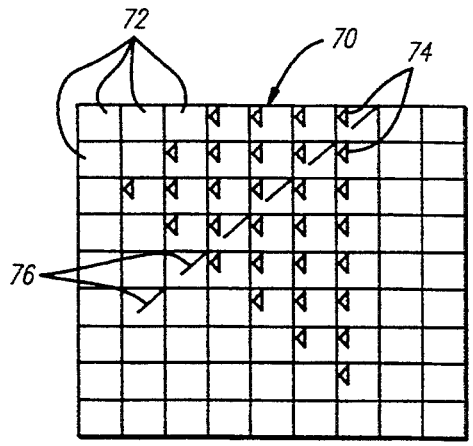
FIG. 4 is a graphic representation to illustrate a pixel processing load.
FIG. 5 is a graphic representation to illustrate one screen space partitioning format for pixel processors.
FIG. 6 is a graphic representation to illustrate another screen space partitioning format for pixel processors.
FIG. 7 is a graphic representation to illustrate an expanded treatment of the format of FIG. 6.

Pursuing the raster pattern representation of the array 70 in FIG. 5, note that each line is designated in numerical sequence from "0" to "8". Assuming a system with nine pixel processors, one partitioning technique may simply involve a numerical distribution as indicated in FIG. 5. That is, for each row or line of pixels in the array 70, assignments would be made to the processors in numerical order from "0" to "8". Accordingly, all of the pixels for the first column (designated 0) would be processed by one pixel processor, e.g. processor unit CP1. The pixels of the second column (designated "1") would be designated by another pixel processor, e.g. unit CP2 and so on with respect to each of the columns as depicted in FIG. 5.

Assume now an overlay of the two arrays 70 to indicate load distributions of the pixel processors. Specifically, it may be seen that the pixel processor for the column "6" would be involved with the processing of eight polygon pixels 74 and one line pixel 76. During the same interval, the polygon processors for the columns of "0", "7" and "8" would perform no processing at all. Thus, a very inequitable load distribution is indicated.

Although load distribution is poor, in the example of FIGS. 4 and 5, in view of the incremental column assignments with x address changes counting across a scan line, effective display read out is provided. That is, a favorable mapping of frame buffer banks to the display for display work is a simple sequence that includes every bank and repeats as illustrated. The problem, as explained above, resides in inequitable pixel load processing distribution.

Referring to FIG. 6, again utilizing the format of the array 70, a different bank-to-screen mapping is illustrated that preserves the sequential scan line feature and distributes the work well between pixel processors. Note that the number of pixel processors has been extended to 32 as somewhat realistic. Accordingly, analysis of FIG. 6 indicates that in performing the processing represented by the structure of FIG. 4, five of the banks would have no touches or involvement, nineteen banks would have one touch, seven banks would have two touches and one bank would have three touches. Thus, by assigning pixel locations of a raster scan pattern in sequence across a line, skipping a significant number in the sequence, then proceeding with another sequence, a mapping is provided to satisfy work load and display criteria.

Another consideration would be for a distribution system to make the sorting function from pixel x-y address to address-of-bank and address-in-bank easy to calculate. The following equations indicate a formula for sorting from pixel x-y address to address-of-bank and address-in-bank. Choose a scan line $X_{SC}$ that is slightly longer than the display. Then, $$\text{address of bank} = (y \cdot X_{SC} + x) \bmod_n$$

$$\text{address in bank} = (y \cdot X_{SC} + x) \text{div}_n$$

where n is the number of processors and x and y are display address in a raster pattern, e.g. columns and lines.

For a "1280" by "1024" display, consider that $X_{SC}=$"1292", and n="32". Accordingly, equations 1 and 2 yield the mappings as shown in FIG. 7. Thus, it may be seen that the system attains a criteria objectives as indicated above. Note that within the box 75, all processors (0–31) are used.

In view of the mapping considerations and system as set forth above, returning to a consideration of FIG. 3 operation now may be summarized. The units CP1–CPM receive update pixels for analysis with reference to frame buffer pixels. Specifically, update pixels and frame buffer pixels are compared to determine visibility and blending as described above. As a result of such processing, fresh frame buffer pixels are stored in each of the frame buffer banks FB1–FBM. Cyclicly display pixels are extracted from the frame buffer and are delivered through the MUX 60 for conversion to an analogue signal to drive the display unit 64.

Note that when the display is refreshed, pixels are supplied through the FIFOs FO1–FOM to the display pixel MUX 60 to arrange the display pixel data in a raster scan order. Consequently, sequences of digital signals representative of a display signal in raster format is supplied to the digital-analogue converter 62 for the generation of an analogue drive signal.

In operation, the system as disclosed above attains effective parallelism for faster rendering. Of course, various forms of complements may be utilized and other options and variations are also possible without departing from the spirit of the invention. For example, substantial deviations are possible within the specific forms of complements employed and even the paths for accomplishing the desired parallelism. Accordingly, the scope hereof should not be limited to the specific disclosure herein but rather should be determined by the claims.

What is claimed is:

1. A graphics system for processing primitive data, as from a host computer, to provide display data in the form of display pixels related to locations in a display, said graphics system comprising:
    a structure for processing said primitive data to provide representative update pixels related to the locations in said display;
    a plurality of visibility-and-blend processors, said visibility-and-blend processors each including an associated frame buffer bank, the frame buffer banks collectively defining a composite frame buffer, each frame buffer bank for storing predetermined frame buffer pixels that are spaced apart and in sequence skipping locations of said display, said plurality of visibility-and-blend processors each for iteratively processing said update pixels in said associated frame buffer bank; and
    a switch structure for supplying said update pixels to said plurality of visibility-and-blend processors in accordance with said sequence skipping locations of said display.

2. A system according to claim 1 wherein said structure for processing said primitive data comprises a plurality of primitive processors for iteratively receiving and processing the primitive data for individual primitives.

3. A system according to claim 2 wherein said primitive processors receive primitive coherent data, said plurality of visibility-and-blend processors receive screen space coherent data.

4. A system according to claim 3 further including a display unit coupled to receive display sequence data.

5. A system according to claim 3 further including a pixel multiplexer for receiving frame buffer pixels from said frame buffer banks to provide said display pixels in a display sequence according to a raster pattern.

6. A system according to claim 1 wherein said structure for processing said primitive data includes means for scan converting said primitive data.

7. A system according to claim 6 wherein said structure for processing said primitive data further includes means for shading said primitive data.

8. A system according to claim 1 wherein said plurality of visibility-and-blend processors determine visibility between said update pixels and content of said associated frame buffer bank to resolve contention.

9. A system according to claim 1 wherein said plurality of visibility-and-blend processors further include FIFOs for storing pixel data.

10. A system according to claim 1 further including a display pixel multiplexer for receiving display pixels from said frame buffer banks to provide said display pixels in a display sequence.

11. A system according to claim 10 wherein said display sequence is a raster pattern.

12. A system according to claim 1 wherein said sequence skipping locations are related to a raster scan pattern.

13. A system according to claim 1 wherein said sequence skipping locations are specified in line raster numerical sequence with skip voids between lines.

14. A system according to claim 13 wherein said frame buffer pixels are addressed to said frame buffer banks in accordance with the following:
    address of frame buffer bank as related to a numerical sequence raster scan$=(y \cdot X_{SC}+x) \bmod_n$ where:
    y = raster line,
    x = pixel in line,
    $X_{SC}$ = length of scan line, and
    n = number of banks 15. A system according to claim 13 wherein said frame buffer pixels are addressed to said frame buffer banks in accordance with the following:
    address in said frame buffer banks as related to a numerical sequence raster scan$=(y \cdot X_{SC}+x) \mathrm{div}_n$ where:
    y = raster line,
    x = pixel in line,
    $X_{SC}$ = length of scan line, and
    n = number of banks.

* * * * *